Patented Sept. 5, 1944

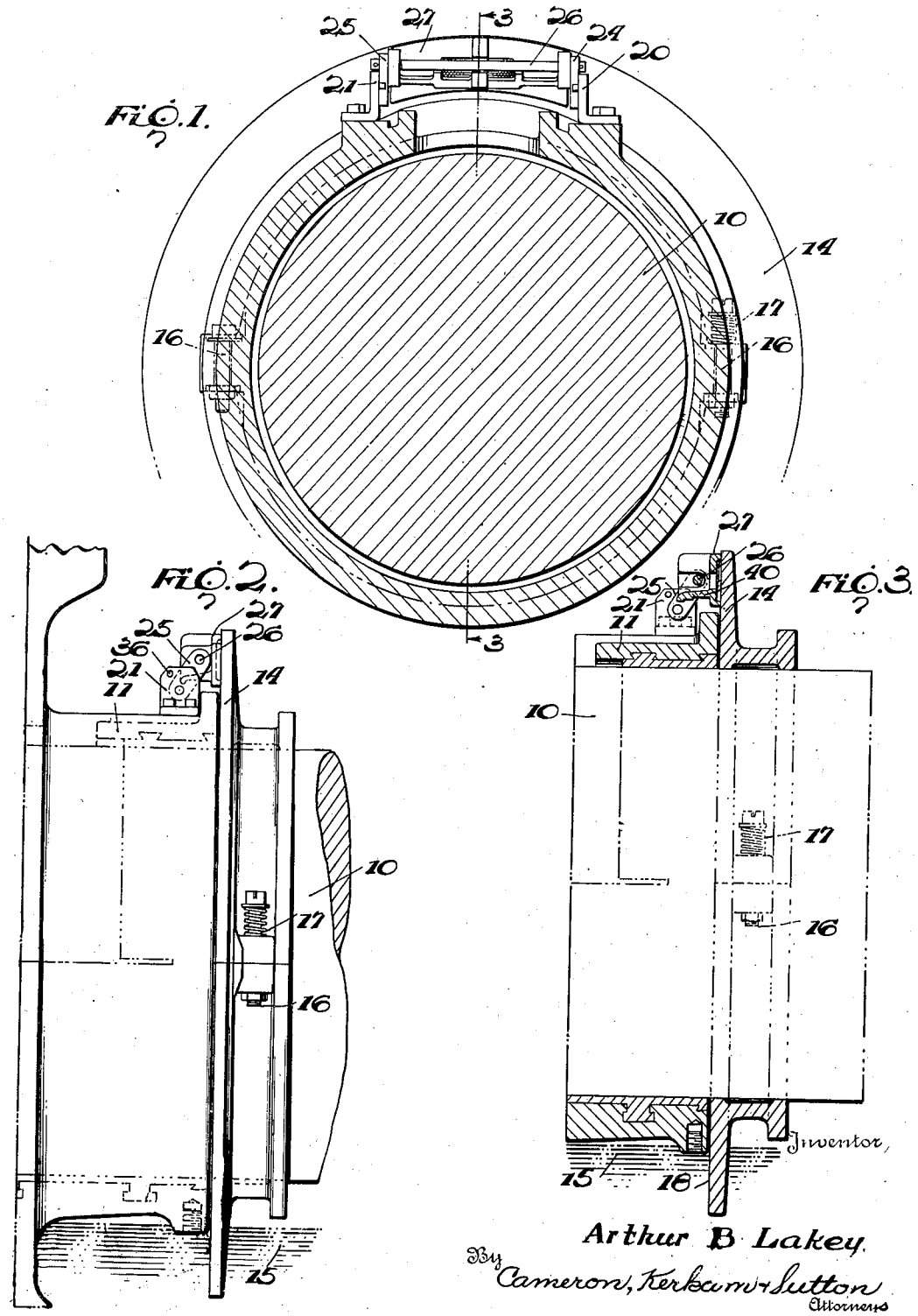

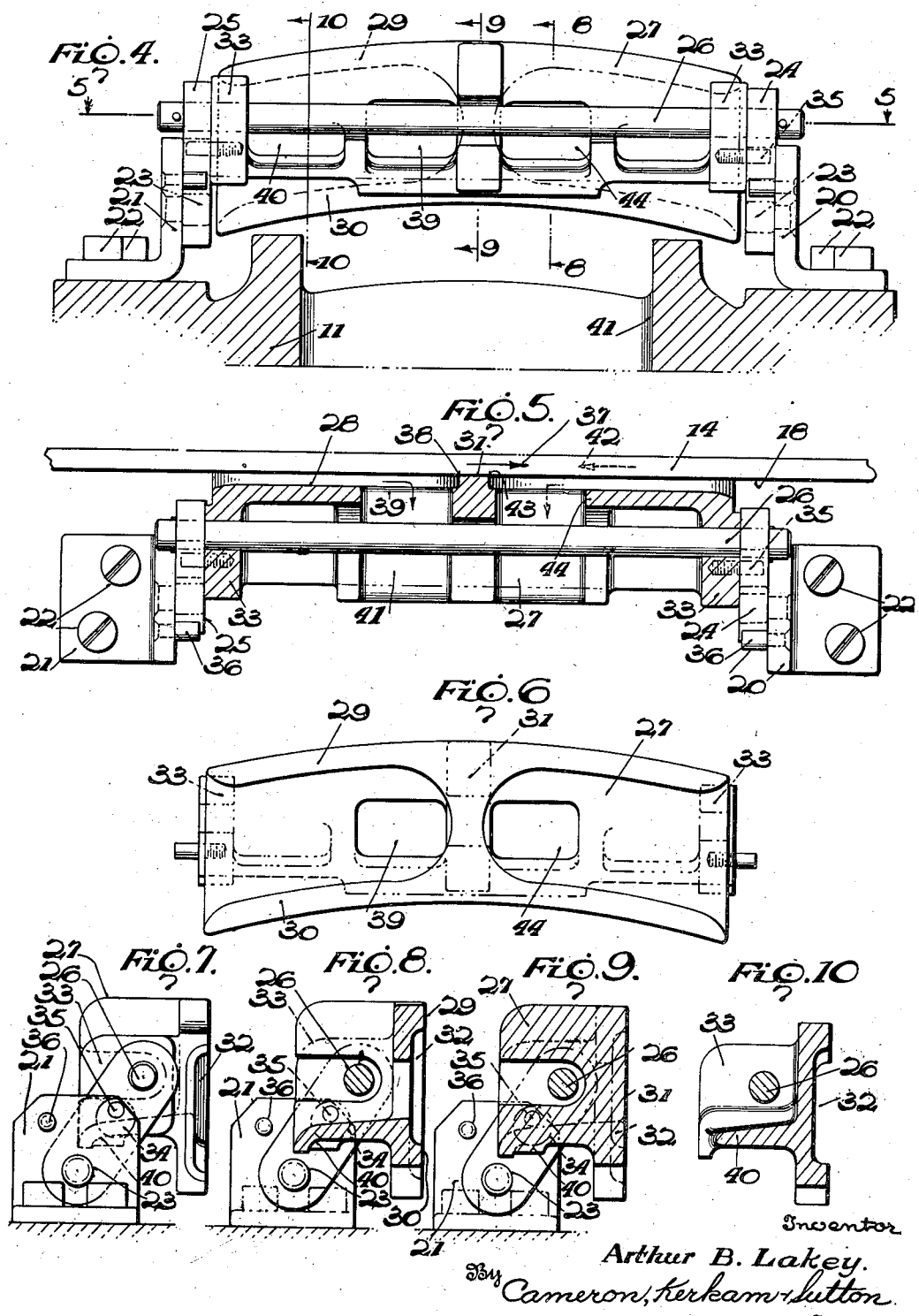

2,357,410

UNITED STATES PATENT OFFICE 2,357,410

BEARING LUBRICATING MEANS

Arthur B. Lakey, Philadelphia, Pa., assignor to Kingsbury Machine Works, Inc., Philadelphia, Pa., a corporation of Delaware Application April 9, 1943, Serial No. 482,429

10 Claims. (Cl. 308—127)

This invention relates to lubricating means for bearings, particularly journal bearings or the like associated with relatively horizontal shafts.

It has heretofore been proposed to lubricate journal and like bearings on horizontal shafts by means of ring oilers rotatably suspended on the shaft and dipping into a body of oil below the same. While sufficient for some conditions, ring oilers have not proved entirely satisfactory, particularly in conjunction with shafts rotating at fairly high speed, because of the danger of slippage between the ring and the shaft with a resultant inadequate supply of lubricant to the journal or other bearing. Numerous proposals have also been made with respect to the provision of lubrication for journal and other bearings by use of a disc rotating with the shaft and dipping into a body of oil below the same, means being associated with the disc to remove oil therefrom to effect the desired lubrication. Such lubricating provisions have been found to supply adequate quantities of oil to the journal or other bearings but the introduction of the provisions for removing oil from the disc as heretofore proposed, ordinarily through use of structures riding on and embracing the periphery of the rotating disc, has involved complication and expense that it is desirable to avoid.

It is an object of this invention to provide disc oiling means of simplified construction that will assure an adequate supply of lubricant to the journal or other bearings and at the same time minimize complexity and cost of installation.

Another object of this invention is to provide disc oiling means of the type characterized which permits the diameter of the oiling disc to be held to a minimum.

Another object of this invention is to provide disc oiling means of the type characterized which avoids use of oil scraping means riding on and embracing the periphery of the disc.

Another object of this invention is to provide disc oiling means of the type characterized which utilizes only one face of the disc and therefore avoids the need for machining more than one face of the disc.

Another object of this invention is to provide disc oiling means of the type characterized which will function satisfactorily when the disc has axial freedom of motion with relation to the bearing housing or bearing shell, as when the shaft has some axial play during rotation.

Another object of this invention is to provide disc lubricating means of the type characterized with stationarily supported oil scraping means in a construction which does not require any close adherence to a predetermined spacing of the disc with respect to the end of the bearing housing or its shell or other stationary means in which the oil scraping means is supported.

Another object of this invention is to provide disc oiling means of the type characterized with oil scraping means which rests against the oil carrying face of the disc by the force of gravity with sufficient pressure to remove adequate quantities of lubricant under all conditions of temperature and speed.

Another object of this invention is to provide disc oiling means of the type characterized which automatically adjusts itself to any position taken by the disc with reference to the bearing housing or its shell.

Another object of this invention is to provide disc oiling means of the type characterized which is so constructed that it is impossible to assemble the oil scraping means in a wrong position.

Another object of this invention is to provide disc oiling means of the type characterized with oil scraping means which are so constructed that the oil scraping member cannot assume a cocked position or produce binding.

Another object of this invention is to provide disc oiling means of the type characterized with oil scraping means which is so constructed that the oil scraping member cannot get out of proper cooperation with the disc while at the same time having adequate freedom of movement so that it may take up its proper position with respect to the disc under variations of spacing of the disc from the support for said member either as a result of initial variations in spacing or because of movements of the shaft or disc during operation.

Another object of this invention is to provide disc oiling means of the type characterized with a scraper which may be readily standardized so that it may be used with discs designed to rotate in either direction as well as with discs that may rotate in opposite directions at different times, although if preferred the scraper can be constructed for one direction of rotation only.

Another object of this invention is to provide disc oiling means of the type characterized with oil scraping means so constructed that the same may be applied to bearings already installed as well as incorporated in new installations.

Another object of this invention is to provide disc oiling means of the type characterized which is of simple construction, inexpensive to manufacture and install, and yet one which is reliable and certain in operation.

Other objects will appear as the description of the invention proceeds.

The invention is capable of receiving a variety of mechanical expressions, one of which is illustrated on the accompanying drawings, but it is to be expressly understood that the drawings are for purposes of illustration only, and are not to be construed as a definition of the limits of the invention, reference being had to the appended claims for that purpose.

Referring in detail to the drawings, wherein the same reference characters are employed to designate corresponding parts in the several figures.

Fig. 1 is a cross section through a shaft with which is associated disc oiling means embodying the present invention;

Fig. 2 is a side elevation of the embodiment shown in Fig. 1;

Fig. 3 is an axial section through the embodiment of Fig. 1;

Fig. 4 is an enlarged rear elevation of the oil scraping means;

Fig. 5 is a section on the line 5—5 of Fig. 4;

Fig. 6 is a front elevation of the oil scraping member;

Fig. 7 is an end elevation of the embodiment of Fig. 4; and

Figs. 8, 9 and 10 are respectively cross sections on the lines 8—8, 9—9 and 10—10 of Fig. 4.

In the embodiment illustrated, shaft 10 is shown as provided with any suitable journal or other bearing 11 having any suitable housing and bearing shell, it being expressly understood that the character and construction of the bearing, and of its housing and shell, constitute no part of the present invention, as the same may be of any suitable construction. Associated with the bearing 11 is a disc 14 designed to dip into a body of oil 15 in the lower part of the housing for the purpose of carrying oil upwardly on said disc to a position from which it may be removed by oil scraping means to be described and thereafter led through any suitable passages to the bearing 11, and if desired to any other bearing or bearings or other means to be lubricated. In the preferred embodiment disc 14 is made in halves suitably secured together around the periphery of the shaft, as shown in Fig. 1, the halves of the disc being suitably bolted together as indicated at 16, and as shown in Fig. 2 a coil spring 17 is preferably interposed between the head of the bolt and the corresponding lug on the disc half, at one or both sides of the shaft, so that the disc is clamped resiliently in engagement with the shaft for rotation therewith but with a capacity for relative movement with respect thereto.

In conformity with the present invention only that face of the disc 14 which is contiguous to the end of the bearing 11 is to be used for supplying lubricant, as experience has demonstrated that with properly efficient oil scraping means adequate quantities of lubricant can be obtained when only one face of the disc is used. This possesses the advantage that said disc need be machined at only one face, and thereby the initial cost reduced. Suitably mounted on the shell of bearing 11 for cooperation with the active face 18 of disc 14 is oil scraping means now to be described, said scraping means being mounted at the end of the bearing shell contiguous to the disc and being so constructed and arranged that under the force of gravity it rests against said face 18 but has adequate freedom of movement if the disc moves axially with respect to the bearing shell or its housing.

Referring particularly to Figs. 4 to 10 inclusive, a pair of L-shaped brackets 20 and 21 are suitably attached to the bearing shell or housing as by bolts or screws 22. Pivotally mounted upon said brackets 20 and 21, as by rivets or other suitable pivot pins 23, are links 24 and 25. Supported in aligned apertures in said links 24 and 25, and suitably retained against displacement therefrom, is a rod or bar 26 on which is pivotally mounted the oil scraping member designated 27.

Oil scraping member 27 in elevation is generally arcuate in shape to approximate the outline of the disc 14. At its operative face 28, said face has outer and inner raised arcuate surfaces or ribs 29 and 30 extending the entire length of member 27, said surfaces adapted to make bearing contact with the face of the disc 14. Where as shown the member 27 is adapted to be operative for either direction of shaft rotation, said surfaces 29 and 30 are joined intermediate their length by a transverse or radially extending bridge 31. Therefore, at either side of said bridge 31 member 27 at its active face 28 is provided with channel-shaped recesses 32 open at the extremity of the member 27 and terminating at the bridge 31. If the scraper is to operate for only one direction of shaft rotation, the bridge 31, which provides the active oil scraping surface, may be disposed at or adjacent the end of the member 27 with only one channel-shaped recess 32 at one side thereof.

Projecting rearwardly from the body of the member 27, and at opposite extremities thereof, are arms or lugs 33 suitably apertured to receive the rod or bar 26. The member 27 is pivotally mounted on said bar or rod 26 and may accordingly move around the axis of said bar or rod to maintain its active face in parallel relationship to the active face 18 of said disc 14. To prevent undue displacement of said member 27 around its supporting bar or rod 26, and particularly to prevent such movement of the member 27 as would bring its active face 28 out of cooperative relationship with said active face 18 of disc 14, means are preferably provided between member 27 and one or both of the links 24, 25 so as to restrain said member 27 from undue movement while permitting such freedom of movement as will retain its active face in proper position for cooperative relationship with face 18 of disc 14. As shown, link 24 is provided with an aperture 34, and suitably secured in the member 27 and projecting into said aperture 34 is a pin 35 whose cross section is materially smaller than said aperture 34. Therefore, the member 27 may swing around its supporting bar or rod 26 within limits, but not to such an extent that its active face 28 will be out of approximately parallel relationship to the face of disc 14. While such an aperture and pin for restraining and controlling the movement of the oil scraping member have been shown as provided at only one end of the latter, a like provision may obviously be incorporated at the opposite end if desired.

Further, to prevent dislodgement of the oil scraping member out of operative relationship with the face of disc 14, one or both of the brackets 20, 21 may be provided with pins 36 adapted to engage the links 24, 25 and prevent movement of the oil scraping member upwardly around the pivot pins 23 from the position shown in Figs. 7, 8 and 9 to such an extent as to cause the center of gravity of the oil scraper assembly assuming a position above or to the left of its axis of movement as shown in said figures. This provision performs the dual function of making it impossible to so assemble the oil scraping member with the disc that it is not in operative relationship with said disc and also makes it impossible for the oil scraping member to be so displaced from its operative position that gravity will not restore the oil scraping member to its cooperative relationship with the face of disc 14. Ordinarily, stop pins as just described, preventing movement of the oil scraping member into or past a dead center position as just referred to, are sufficient, but as will be apparent, if desired, additional pins may be provided for cooperation with the underside of the links 24 and 25 so as to prevent said links, and the member 27 supported thereby, from dropping below the extreme position which would ever be desirably assumed by the oil scraper assembly in operation.

It will be noted that, as shown, and in conformity with the preferred embodiment, the brackets 20, 21, in end elevation, overlap the arms or lugs 33 and the links 24 and 25 are positioned between the brackets 20, 21 and said lugs or arms 33, although within the broader aspects of this invention the links may be otherwise assembled with respect to the brackets and the oil scraping member. Therefore, the links 24, 25, which are themselves parallel-faced elements, are disposed between parallel overlapping faces at each extremity of the oil scraping member. This construction is preferred because, by reason of the aforesaid relationship and construction of parts, the oil scraping member can never become cocked on its pivotal support, but will always be retained in a position in which its active face 28 is circumferentially parallel to the active face of the disc 14.

In assembly, a stationary part of the structure adjacent the disc 14, which may be the housing or shell of a journal bearing, is suitably drilled for the bolts or screws 22 in such position that the pivotal axis 23 will lie in a plane at right angles to the axis of the shaft and therefore parallel to the active face 18 of the disc 14. With the oil scraping means constructed and arranged as heretofore described, the oil scraping member 27, when mounted in position by the brackets 20, 21, rests, by the action of gravity and preferably though not necessarily only by the action of gravity, against the active face 18 of the disc 14, the links 24 and 25 pivoting around the axis 23 and the oil scraping member 27 pivoting around the axis provided by the bar or rod 26. In so assembling the parts it is impossible to so mount the oil scraper assembly that it will not be in proper operating relationship with the disc 14, because the pin or pins 36 as heretofore described will prevent the parts being so mounted that gravity will not cause the oil scraping member 27 to fall toward the right as viewed in Figs. 7, 8 and 9. At the same time, the member 27 cannot move around the axis of the bar or rod 26 to such a position as to get out of approximately parallel relationship with the face of the disc 14 because of the restraint imposed by the cooperation of the pin 35 with its aperture 34. At the same time, sufficient play is provided between said aperture and pin so that member 27 may move around its own axis and remain in parallel relationship to the face of the disc 14 even though the angle of the links 24, 25 to the horizontal may vary either during the operation of the structure or because of variations in the spacing of the disc 14 from the support of the oil scraper assembly. Thus the oil scraping member 27 will assume its proper operative relationship with the disc 14 even though the latter be at different distances from the end of the bearing housing or shell and also even though the disc 14 have some axial movement during the rotation of the shaft.

Assuming that the shaft is rotating in the direction of the arrow 37 in Fig. 5, oil adhering to the face 18 of the disc 14 will be removed by the scraping action of the edge 38 of the bridge 31, and from the channel-shaped recess 32 to the left of Fig. 5 it is deflected through one or more suitable openings 39 in the member 27, from which it may be conveyed, as along a suitable surface on a shelf 40 provided at the rear of said member 27, to any suitable aperture, passage, reservoir, etc., the inlet of which is indicated at 41 in Fig. 4, for distribution to one or more bearings or any other place where the lubricant is to be utilized. If the disc 14 is rotating in the direction of the dotted arrow 42 of Fig. 5 the oil is similarly scraped from the face 18 by the edge 43 of bridge 31 and deflected from the channel-shaped recess 32 at the right of Fig. 5 through one or more suitable apertures 44 along the shelf 40 to inlet 41. The oil scraping means is thus equally available for either direction of shaft rotation, although as heretofore pointed out the oil scraping means may be constructed for one direction of shaft rotation if preferred.

It will therefore be perceived that by the present invention a very simple and inexpensive oil scraping means has been provided. By utilizing only one face of the disc 14 the opposite face of the disc requires no machining or special treatment and initial cost is saved. Also, the complexity and increased cost incident to the use of oil scrapers floating on and embracing the periphery of the disc have been avoided. By utilizing gravity as the sole means of retaining the oil scraping means in contact with the face of the disc, simplicity of construction is obtained, and by reason of the character of pivotal mounting of the oil scraping means provided it is unnecessary to work to close tolerances insofar as predetermining the spacing between the disc 14 and the end of the bearing housing or shell is concerned, because the oil scraper will assume its proper position even though there be considerable variation in the spacing of the disc from the end of the bearing housing or shell or other stationary means upon which the same is mounted. At the same time, the oil scraper can float freely in contact with the active face of the disc 14 and follow any axial displacement of said disc during the rotation of the shaft, it being understood that a considerable clearance is provided between the links 24 and 25 and the brackets 20 and 21, on the one hand, and the scraper 27, on the other hand, while diametrical clearance is provided between the pivot pins 23 and said links and between the bar 26 and said links and scraper, so as to preclude the relatively movable parts sticking or binding and thus preventing the scraper from lying freely, loosely and flatly against the active face of the disc (although such clearances are not illustrated on the drawings). The oil scraper assembly is also so constructed as to assure that it cannot be assembled in a wrong position, and furthermore to assure that at no time can the oil scraping member be so dislodged or displaced that it is not restored by gravity to its proper cooperative relationship with the active face of the disc 14. Thus the oil scraping means automatically assumes and retains its proper operating position while providing for such movements of the oil scraping means as required by variations in the temperature and speed of operation as well as movements of the disc or shaft. At the same time, the oil scraping means of the present invention is composed of a relatively few number of simple parts that are easily manufactured, standardization is facilitated, and the structure is such that it can be readily assembled with assurance that it will work efficiently to supply adequate quantities of lubricant.

While the embodiment of the invention illustrated on the drawings has been described with considerable particularity, it is to be expressly understood that the invention is not to be restricted thereto, as other embodiments will now readily suggest themselves to those skilled in the art without departing from the principles of the present invention, while changes may be made in the details of construction, arrangement, proportion, etc., of parts within the contemplation of the invention. References is therefore to be had to the appended claims for a definition of said invention.

What is claimed is:

1. In a lubricating means of the type employing a disc rotating with a shaft and conveying lubricant from a source below the shaft to a position for removal and transfer to the part or parts to be lubricated, oil scraping means cooperating with only one face of said disc and resting against said face by gravity.

2. In a lubricating means of the type employing a disc rotating with a shaft and conveying lubricant from a source below the shaft to a position for removal and transfer to the part or parts to be lubricated, pivotally supported oil scraping means mounted to float in contact with a face of said disc under the action of its own weight.

3. In a lubricating means of the type employing a disc rotating with a shaft and conveying lubricant from a source below the shaft to a position for removal and transfer to the part or parts to be lubricated, pivotally supported oil scraping means resting against a face of said disc by gravity, and means cooperating with said oil scraping means to prevent its movement out of operative relationship to the face of said disc.

4. In a lubricating means of the type employing a disc rotating with a shaft and conveying lubricant from a source below the shaft to a position for removal and transfer to the part or parts to be lubricated, oil scraping means cooperating with a face of said disc to remove oil therefrom, and means pivotally mounting said oil scraping means for movement about an axis parallel to the face of said disc in a position wherein said oil scraping means rests against said face of said disc by gravity.

5. In a lubricating means of the type employing a disc rotating with a shaft and conveying lubricant from a source below the shaft to a position for removal and transfer to the part or parts to be lubricated, oil scraping means cooperating with a face of said disc to remove oil therefrom, means pivotally mounting said oil scraping means for movement about an axis parallel to the face of said disc in a position wherein said oil scraping means rests against the face of said disc by gravity, and means cooperating with said oil scraping means to prevent its movement to a position from which it is not restored to operative relationship to said face by gravity.

6. In a lubricating means of the type employing a disc rotating with a shaft and conveying lubricant from a source below the shaft to a position for removal and transfer to the part or parts to be lubricated, oil scraping means cooperating with a face of said disc to remove oil therefrom, means pivotally mounting said oil scraping means for movement about an axis parallel to the face of said disc in a position wherein said oil scraping means rests against the face of said disc by gravity, and means cooperating with said oil scraping means and permitting movement thereof to retain parallel relationship with the face of said disc while preventing movement thereof out of approximate operative relationship to the face of said disc.

7. In a lubricating means of the type employing a disc rotating with a shaft and subject to movement in the direction of the axis of the shaft during operation, said disc conveying lubricant from a source below the shaft to a position for removal and transfer to the part or parts to be lubricated, oil scraping means cooperating with a face of said disc to remove oil therefrom, stationary mounting means, and means movably mounting said oil scraping means on said stationary mounting means and maintaining the face of said oil scraping means in parallel planes as it follows the face of said disc during axial movement.

8. In a lubricating means of the type employing a disc rotating with a shaft and conveying lubricant from a source below the shaft to a position for removal and transfer to the part or parts to be lubricated, oil scraping means cooperating with a face of said disc and including stationary supporting means, links pivoted on said supporting means, and an oil scraping member pivotally mounted on said links on an axis parallel to the pivotal axis of said links for its operative face to move into parallel planes in engaging the face of said disc.

9. In a lubricating means of the type employing a disc rotating with a shaft and conveying lubricant from a source below the shaft to a position for removal and transfer to the part or parts to be lubricated, oil scraping means cooperating with a face of said disc and including stationary supporting means, links pivoted on said supporting means, an oil scraping member pivotally mounted on said links for engagement with the face of said disc, and means cooperating with said links to prevent said oil scraping member assuming a position in which said oil scraper member is out of cooperative relationship with the face of said disc.

10. In a lubricating means of the type employing a disc rotating with a shaft and conveying lubricating from a source below the shaft to a position for removal and transfer to the part or parts to be lubricated, oil scraping means cooperating with a face of said disc and including stationary supporting means, links pivoted on said supporting means, an oil scraping member pivotally mounted on said links for engagement with the face of said disc, and means between said links and oil scraping member for restraining undue pivotal movement of said member with respect to said links but permitting movement of said member to retain its active face in parallel relationship to the face of said disc.

ARTHUR B. LAKEY.